(12) United States Patent
Koay et al.

(10) Patent No.: US 7,615,733 B2
(45) Date of Patent: Nov. 10, 2009

(54) OPTICAL NAVIGATION APPARATUS AND METHOD FOR MAKING THE APPARATUS

(75) Inventors: Ban Kuan Koay, Bayan Lepas (MY); Chiang Sun Cheah, Butterworth (MY); Chin Heong Yeoh, Bukit Mertajam (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/960,639

(22) Filed: Dec. 19, 2007

(65) Prior Publication Data
US 2009/0159780 A1 Jun. 25, 2009

(51) Int. Cl.
*G06M 7/00* (2006.01)
(52) U.S. Cl. ........................ 250/221; 250/239; 250/216; 345/163; 345/166
(58) Field of Classification Search ................. 250/221, 250/239, 216; 345/163, 166
See application file for complete search history.

(56) References Cited

U.S. PATENT DOCUMENTS

| | | | | |
|---|---|---|---|---|
| 4,751,505 A | * | 6/1988 | Williams et al. | 250/221 |
| 5,349,371 A | * | 9/1994 | Fong | 250/221 |
| 6,051,848 A | * | 4/2000 | Webb | 257/99 |
| 6,218,659 B1 | * | 4/2001 | Bidiville et al. | 250/221 |
| 6,933,584 B2 | * | 8/2005 | Miyazaki et al. | 257/432 |
| 6,967,321 B2 | * | 11/2005 | Leong et al. | 250/239 |
| 7,019,733 B2 | * | 3/2006 | Koay | 345/163 |
| 7,045,775 B2 | * | 5/2006 | Leong et al. | 250/239 |
| 7,050,043 B2 | * | 5/2006 | Huang et al. | 345/166 |
| 7,126,585 B2 | * | 10/2006 | Davis et al. | 345/166 |
| 2003/0034959 A1 | * | 2/2003 | Davis et al. | 345/166 |
| 2003/0142078 A1 | * | 7/2003 | Chin | 345/166 |
| 2006/0007148 A1 | * | 1/2006 | Theytaz et al. | 345/163 |
| 2006/0256086 A1 | * | 11/2006 | Xie et al. | 345/166 |

* cited by examiner

*Primary Examiner*—Seung C Sohn

(57) ABSTRACT

An optical navigation apparatus and method for making the apparatus uses a light source and a sensor having an imaging array mounted on a leadframe and encapsulated in an optically transparent body structure. The optically transparent body structure is configured to include a prism-like feature to internally reflect light from the light source toward a target surface and an imaging lens feature to optically manipulate the light reflected from the target surface onto the imaging array of the sensor.

17 Claims, 6 Drawing Sheets

OPTICAL NAVIGATION APPARATUS AND METHOD FOR MAKING THE APPARATUS

BACKGROUND OF THE INVENTION

Optical navigation systems detect relative movements between the optical navigation systems and navigation surfaces to perform tracking operations. An optical navigation system uses a light source to generate illumination light on a navigation surface and an image sensor to successively capture frames of image data of the navigation surface using reflected illumination light. The optical navigation system compares the successive frames of image data and estimates the relative movements between the optical navigation system and the navigation surface based on the comparison between the current frame of image data and a previous frame of image data. The optical navigation system is able to track the relative movements between the optical navigation system and the navigation surface by continuously capturing and comparing frames of image data. Optical navigation systems are commonly used in optical computer mice to track the lateral movements of the mice relative to the navigation surfaces on which the mice are manually manipulated.

As illustrated in FIG. 1A, which is an exploded view, a conventional optical navigation system 100 for an optical computer mouse may include a light source in the form of a light emitting diode (LED) 102, an LED holder/clip 104, a mouse printed circuit board 106, a surface mount image sensor package 108, an optical element with an imaging lens 110 and a mouse base plate 112. These components of the optical navigation system 100 need to be assembled, as shown in FIG. 1B, which is a cross-sectional view of the system over a navigation surface 114, in order to be used in an optical computer mouse.

The various components of the optical navigation system 100 not only increases cost and size of the optical navigation system, but also increases the complexity of the system assembly process. Thus, there is a need for an optical navigation system that can reduce the cost and size, and also reduce the complexity of the system assembly process.

SUMMARY OF THE INVENTION

An optical navigation apparatus and method for making the apparatus uses a light source and a sensor having an imaging array mounted on a leadframe and encapsulated in an optically transparent body structure. The optically transparent body structure is configured to include a prism-like feature to internally reflect light from the light source toward a target surface and an imaging lens feature to optically manipulate the light reflected from the target surface onto the imaging array of the sensor. Thus, various components are integrated into a compact package, which reduces the overall size and component count of the apparatus when compared to compatible conventional optical navigation systems.

An optical navigation apparatus in accordance with an embodiment of the invention comprises a leadframe, a light source, a sensor having an imaging array and an optically transparent body structure. The light source, which is configured to emit illuminating light, is mounted on the leadframe. The sensor is also mounted on the leadframe. The optically transparent body structure is connected to the leadframe such that the light source and the sensor are encapsulated by the transparent body structure. The optically transparent body structure includes a prism-like feature positioned over the light source and an imaging lens feature positioned over the sensor. The prism-like feature is configured to internally reflect the illumination light from the light source toward a target surface. The imaging lens feature is configured to receive the illumination light reflected from the target surface and optically manipulate the received illumination light onto the imaging array of the sensor.

An optical navigation apparatus in accordance with another embodiment comprises a leadframe, a light source, a sensor having an imaging array and an optically transparent body structure. The light source, which is configured to emit illuminating light, is mounted on the leadframe. The sensor is also mounted on the leadframe. The optically transparent body structure is connected to the leadframe such that the light source and the sensor are encapsulated by the transparent body structure. The optically transparent body structure includes a prism-like feature positioned over the light source and an imaging lens feature positioned over the sensor. The prism-like feature is configured to internally reflect the illumination light from the light source so that the illumination light strikes a target surface at a nonzero angle of incidence with respect to normal to the target surface. The imaging lens feature is configured to receive the illumination light reflected from the target surface and optically manipulate the received illumination light onto the imaging array of the sensor. The transparent body structure further includes a groove positioned between the light source and the sensor. The groove is used to prevent optical noise from being transmitted to the sensor from the light source.

A method for making an optical navigation apparatus in accordance with an embodiment of the invention comprises providing a light source, a sensor with an imaging array and a leadframe, mounting the light source and the sensor onto the leadframe, and forming an optically transparent body structure connected to the leadframe such that the light source and the sensor are encapsulated by the optically transparent body structure. The optically transparent body structure includes a prism-like feature positioned over the light source and an imaging lens feature positioned over the sensor. The prism-like feature is configured to internally reflect the illumination light from the light source toward a target surface during operation. The imaging lens feature is configured to receive the illumination light reflected from the target surface and optically manipulate the received illumination light onto the imaging array of the sensor.

Other aspects and advantages of the present invention will become apparent from the following detailed description, taken in conjunction with the accompanying drawings, illustrated by way of example of the principles of the invention.

DETAILED DESCRIPTION

Figure 1A:
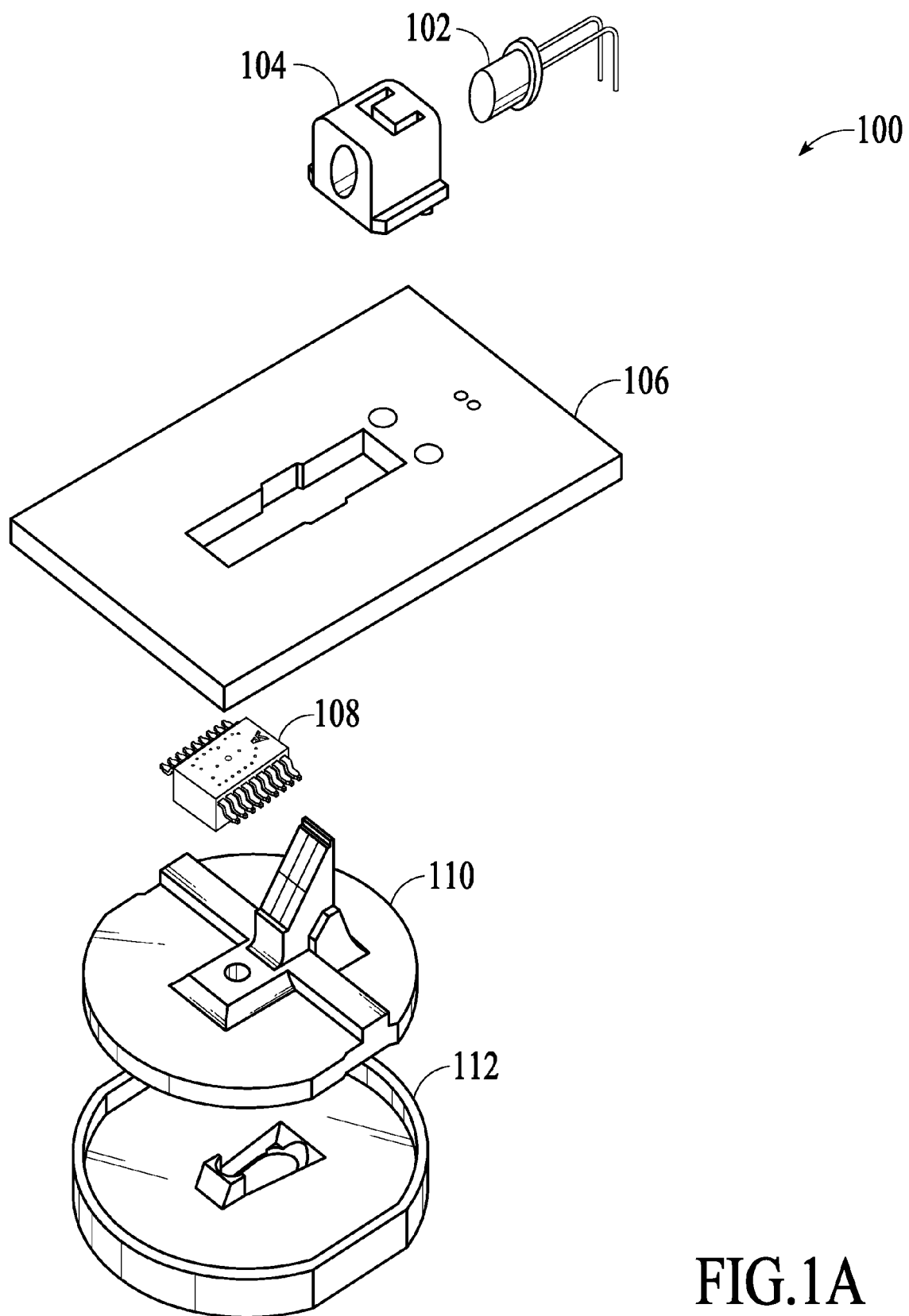
FIG. 1A is an exploded view of an optical navigation system in accordance with prior art.
Figure 1B:
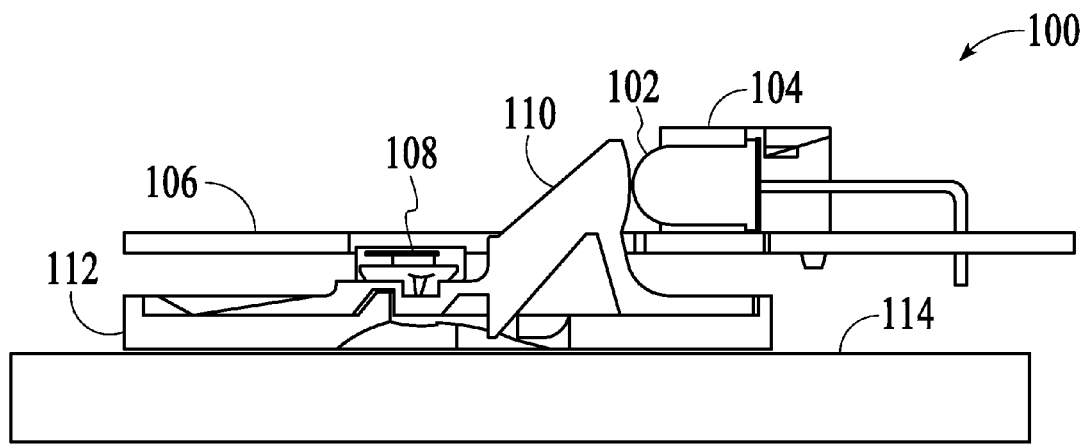
FIG. 1B is a cross-sectional view of the optical navigation system of FIG. 1A.
Figure 2:
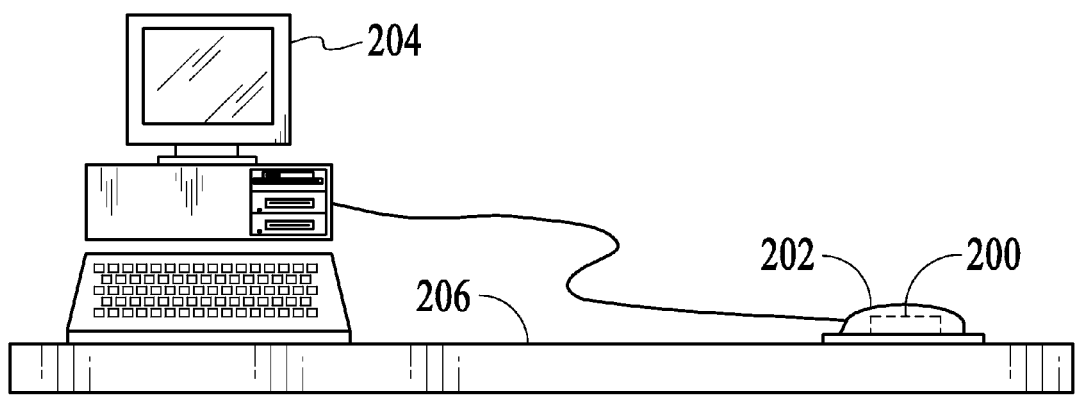
FIG. 2 is a block diagram of an optical navigation apparatus, which is included in an optical computer mouse, in accordance with an embodiment of the invention.

With reference to FIG. 2, an optical navigation apparatus 200 in accordance with an embodiment of the invention is described. As shown in FIG. 2, the optical navigation apparatus 200 is included in an optical computer mouse 202, which is connected to a computer 204. In other embodiments, the optical computer mouse 202 may be wirelessly connected to the computer 204. In this implementation, the optical navigation apparatus 200 is used to optically track the movements of the optical mouse 202 as the optical mouse is manipulated over a navigation or target surface 206 by a user to control a cursor displayed on the computer 204. However, in other implementations, the optical navigation apparatus 200 can be used in different products for various tracking applications. As an example, the optical navigation apparatus 200 may be used as finger navigation for personal digital assistants (PDAs) and hand phones, as well as Ultra-Mobile PCs (UMPCs).

As described in detail below, the optical navigation apparatus 200 is designed to reduce the number of components included in the apparatus in comparison to conventional optical navigation systems. As a result, the cost and size of the optical navigation apparatus 200 is significantly reduced when compared to these conventional optical navigation systems. Furthermore, the optical navigation apparatus 200 is an integrated device which allows the apparatus to be easily assembled into a final product, such as an optical computer mouse.

Figure 3A:
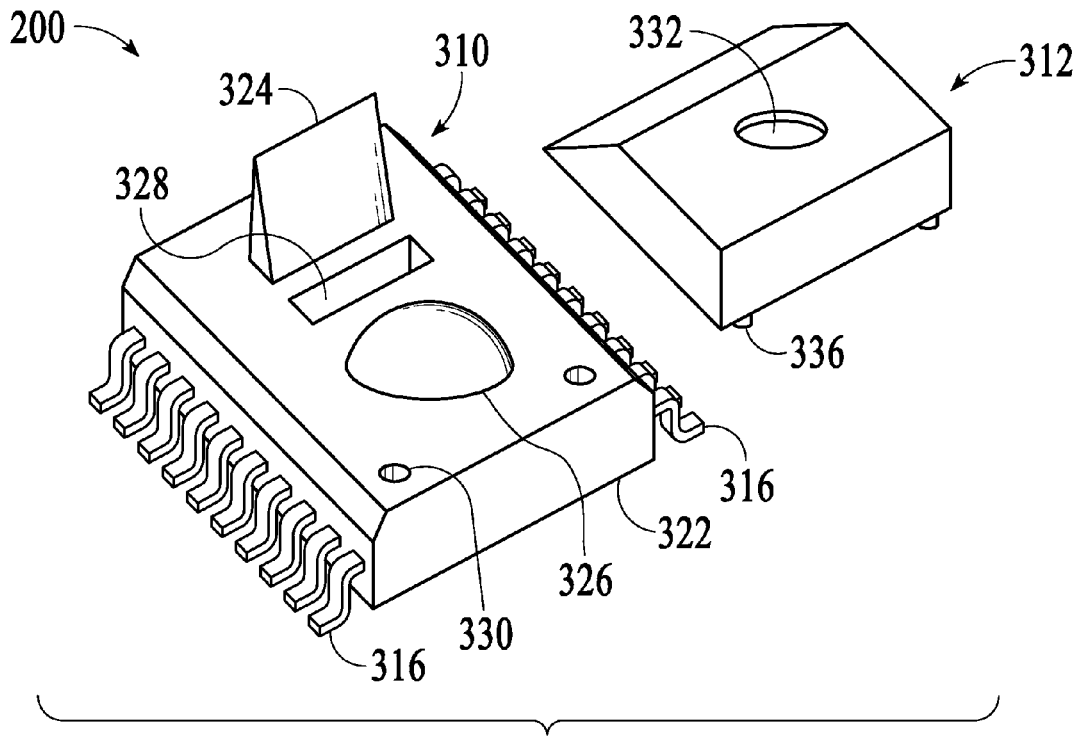
FIG. 3A is a perspective view of the optical navigation apparatus with an aperture lid member detached from an integrated surface mount (SMT) package in accordance with an embodiment of the invention.
Figure 3B:
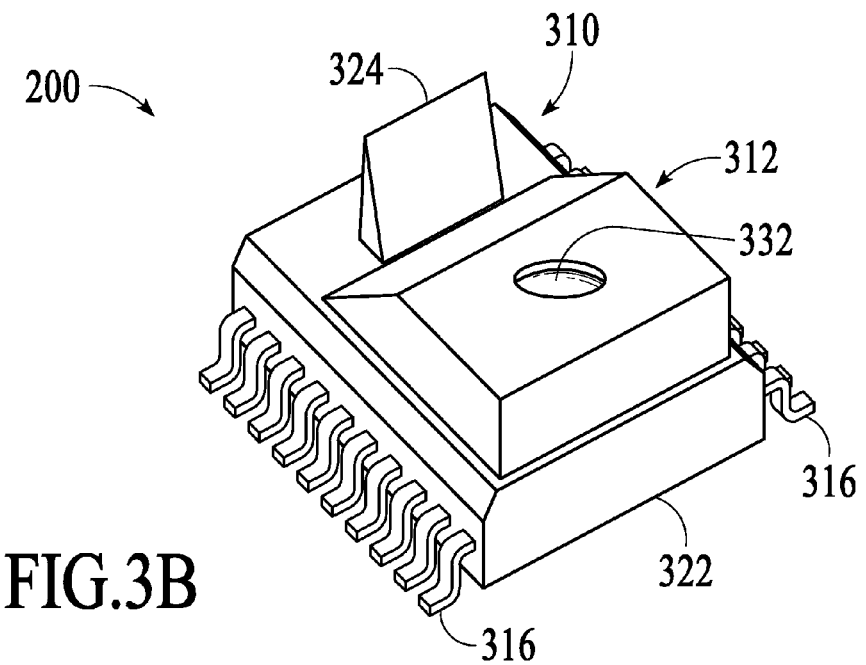
FIG. 3B is a perspective view of the optical navigation apparatus of FIG. 3A with the aperture lid member attached to the integrated SMT package.
Figure 3C:
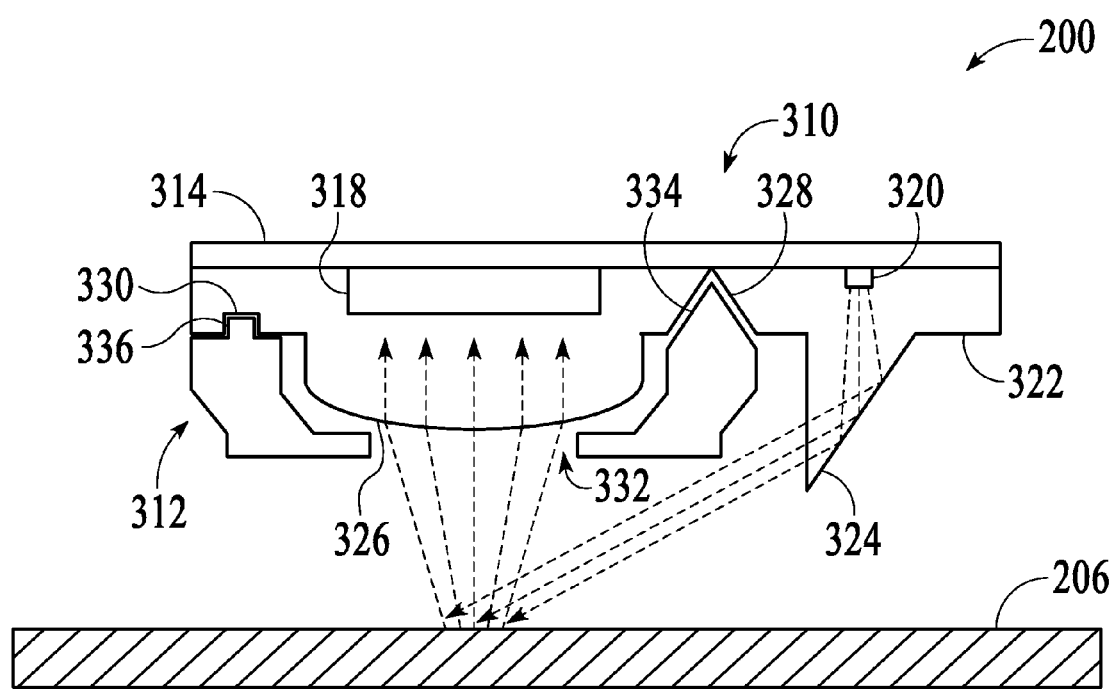
FIG. 3C is a cross-sectional view of the optical navigation apparatus of FIG. 3B.

As shown in FIGS. 3A, 3B and 3C, the optical navigation apparatus 200 includes an integrated surface mount (SMT) package 310 and an aperture lid member 312. The optical navigation apparatus 200 is illustrated in FIG. 3A with the aperture lid member 312 detached from the integrated SMT package 310, while the optical navigation apparatus 200 is illustrated in FIG. 3B with the aperture lid member 312 attached to the integrated SMT package 310. FIG. 3C is a cross-sectional view of the optical navigation apparatus 200 with the attached aperture lid member 312, illustrating internal components of the integrated SMT package 310.

As best shown in FIG. 3C, the integrated SMT package 310 includes a leadframe 314 with leads 316, a navigation sensor 318 and a light source 320. The leads 316 are not shown in FIG. 3C, but shown in FIGS. 3A and 3B. The leadframe 314, the navigation sensor 318 and the light source 320 are encapsulated in a body structure 322 such that the leads 316 extend from the body structure, as shown in FIGS. 3A and 3B. The aperture lid member 312 is attached to the body structure 322, as shown in FIGS. 3B and 3C.

The light source 320 is configured to emit illumination light toward the navigation surface 206 in response to an applied driving signal. The light source 320 can be any type of a light emitting device, such as a light emitting diode (LED) die or a laser diode die, such as a vertical-cavity surface-emitting laser (VCSEL). The light source 320 is mounted onto the leadframe 314, and encapsulated by the body structure 322. In an embodiment, the light source 320 is activated by the navigation sensor 318, which provides driving signals to the light source 320.

Figure 4:
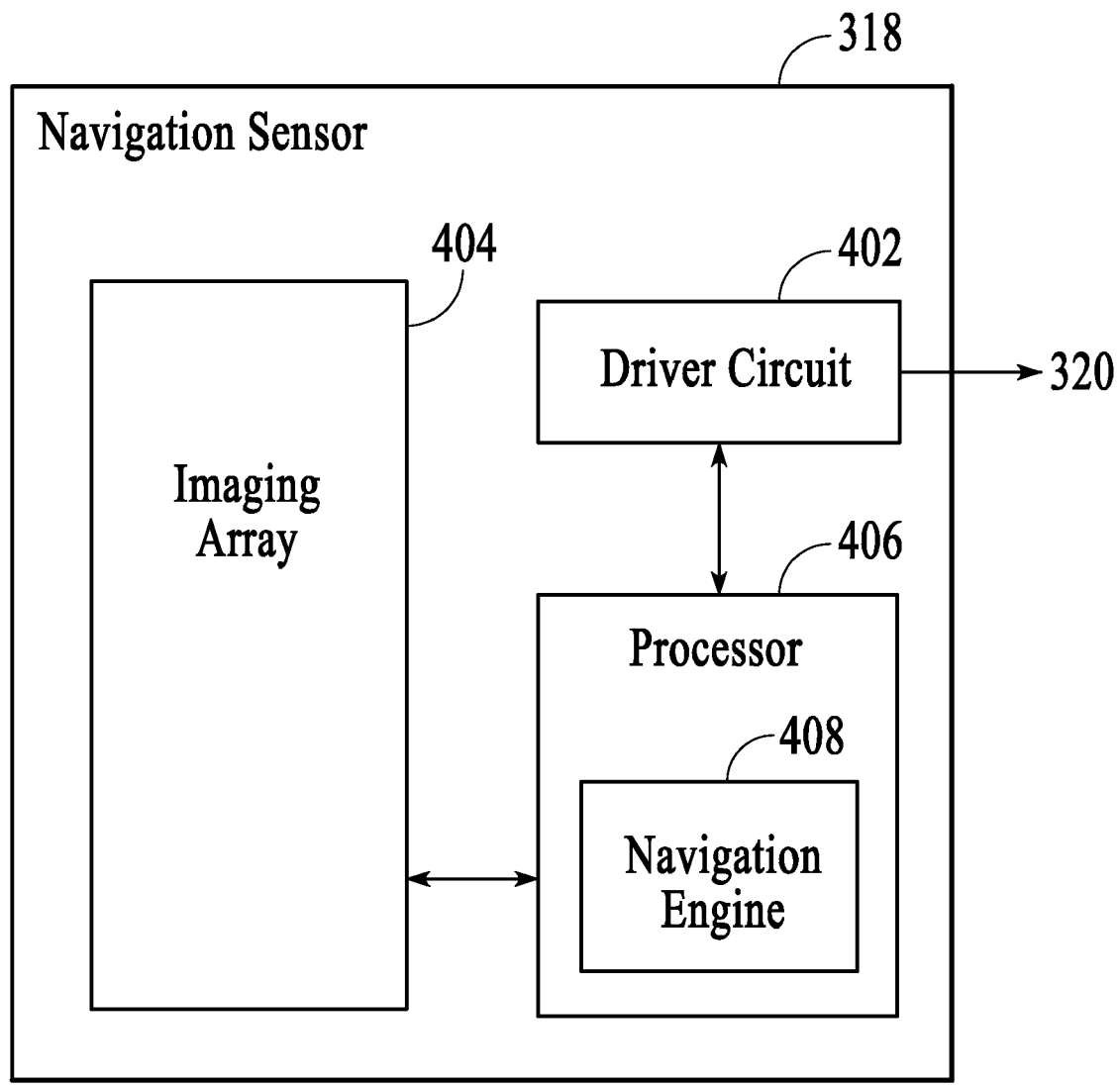
FIG. 4 is a block diagram of a navigation sensor included in the integrated SMT package of the optical navigation apparatus in accordance with an embodiment of the invention.

The navigation sensor 318 is also mounted onto the leadframe 314, and encapsulated by the body structure 322. In an embodiment, as shown in FIG. 4, the navigation sensor 318 is an integrated circuit chip, which includes a driver circuit 402, an imaging array 404 and a processor 406. The navigation sensor 318 also includes supporting circuitry (not shown) for the imaging array 404, such as an analog-to-digital converter and row and column decoders. The navigation sensor 318 may also include other elements commonly found in a conventional navigation sensor for use in an optical computer mouse.

The driver circuit 402 of the navigation sensor 318 is configured to generate driving signals for the light source 320. The driving signals from the driver circuit 402 are transmitted to the light source 320 via the leadframe 314 to activate the light source to generate light, which is used to illuminate a region of the navigation surface 206.

The imaging array 404 of the navigation sensor 318 is an array of photosensitive pixel elements (not shown) that generate signals in response to light incident on the elements, where each signal represents the amount or intensity of light incident on a particular element of the imaging array 404. These signals in digital form are referred to herein as image data. Thus, the imaging array 404 is able to sequentially capture frames of image data in response to incident light, i.e., the illumination light reflected from the navigation surface 206 and received by the imaging array 404 of the navigation sensor 318. These frames of image data are used for correlation to estimate any relative displacement between the optical navigation apparatus 200 and the navigation surface 206. As an example, the imaging array 404 may be a charge-coupled device (CCD) imaging array or a complementary metal oxide semiconductor (CMOS) imaging array. The number of photosensitive pixel elements included in the imaging array 404 may vary depending on at least the particular application of the optical navigation apparatus 200. As an example, the imaging array 404 may be a 30×30 array of photosensitive pixel elements.

The processor 406 of the navigation sensor 318 is configured to control various components of the navigation sensor, including the driver circuit 402 and the imaging array 404, in order to provide illumination light on the navigation surface 206 and to capture frames of image data in response to the illumination light reflected from the navigation surface. The processor 406 is electrically connected to the driver circuit 402 to provide control signals to the driver circuit 402 to direct the driver circuit to apply driving signals to the light source 320 to activate the light source. The processor 406 is also electrically connected to the imaging array 404 via supporting circuitry to provide control signals to control the accumulation of electrical signals or charges at the photosensitive pixel elements of the imaging array 404 to produce each frame of image data for correlation.

In an embodiment, the processor 406 includes a navigation engine 408, which is programmed into the processor. However, in other embodiments, the navigation engine 408 may be a separate component. The navigation engine 408 can be implemented as software, hardware and/or firmware. The navigation engine 408 operates to correlate the frames of image data captured by the imaging array 404 to estimate any lateral displacement changes between the optical navigation apparatus 200 and the navigation surface 206 with respect to X and Y directions, which are parallel to the navigation surface. The process of correlating frames of image data for motion estimation or navigation is well known, and thus, is not described herein. In an embodiment, the output of the navigation engine 408 includes directional delta X displacement values and directional delta Y displacement values. Each directional displacement value includes a negative or positive sign information, which indicates direction, and an absolute displacement value, which indicates the amount of displacement in that direction. In a particular implementation, the directional delta X and Y displacement values are generated in the form of hex numbers.

Although the driver circuit 402, the imaging array 404 and the processor 408 are integrated into the navigation sensor 318 in the illustrated embodiment, some or all of these components may be physically separate devices in other embodiments. In these embodiments, the separate devices may be mounted individually onto the leadframe 314.

The body structure 322 of the integrated SMT package 310 provides a protective cover for the light source 320 and the navigation sensor 318. The body structure 322 is also configured to function as an optical element to optically manipulate the illumination light from the light source 320 onto the navigation surface 206 and to function as an imaging lens to optically manipulate the reflected illumination light from the navigation surface onto the imaging array 404 of the navigation sensor 318. The body structure 322 is made of an optically transparent material to transmit the illumination light from the light source 320 to the navigation surface 206 and to transmit the reflected illumination light from the navigation surface to the navigation sensor 318.

As shown in FIGS. 3A-3C, the body structure 322 is attached to the leadframe 314 so that the light source 320 and the navigation sensor 318 are encapsulated by the body structure. Thus, the body structure 322 covers at least some of the front surface of the leadframe 314 on which the light source 320 and the navigation sensor 318 are mounted. The body structure 322 may also cover the back surface of the leadframe 314, i.e., the surface opposite to the front surface. As shown in FIGS. 3A and 3B, the leads 316 of the leadframe 314 extend from opposing side surfaces of the body structure 322. In the illustrated embodiment, each of the leads 316 of the leadframe 314 is bent in two places so that the leads can be used to surface mount the optical navigation apparatus 200 onto a printed circuit board (not shown) when the optical navigation apparatus is assembled into a product, such as the optical computer mouse 202.

In the illustrated embodiment, the body structure 322 of the integrated SMT package 310 includes a prism-like feature 324, which is positioned over the light source 320 such that the light source is positioned between the leadframe 314 and the prism-like feature. The prism-like feature 324 includes a back surface, which may be normal to the front surface of the leadframe 314, and a reflective flat surface, which is angled to internally reflect the illumination light from the light source 320 toward the navigation surface 206 so that the illumination light strikes the navigation surface at a non-zero angle of incidence with respect to normal to the navigation surface. The angle of the reflective surface of the prism-like feature 324 may be set in accordance with the desired angle of incidence for the illumination light on the navigation surface 206, which may also require an adjustment of the distance between the light source 320 and the navigation sensor 318. In an embodiment, the prism-like feature 324 may be configured to have a cross section in the shape of a right triangle. However, in other embodiments, the prism-like feature 324 may be configured to have a cross section in the shape of a non-right triangle.

The body structure 322 of the integrated SMT package 310 further includes an imaging lens feature 326, which is positioned over the navigation sensor 318 such that the navigation sensor is positioned between the leadframe 314 and the imaging lens feature. The imaging lens feature 326 is configured to optically manipulate received light, i.e., the reflected illumination light from the navigation surface 206, onto the imaging array 404 of the navigation sensor 318. Thus, the imaging lens feature 326 functions as a typical imaging lens commonly found in a conventional optical navigation system used in an optical computer mouse. In the illustrated embodiment, the imaging lens feature 326 includes a convex surface to focus the receive light. However, in other embodiments, the surface of the imaging lens feature 326 may have a different configuration. Also in the illustrated embodiment, the illumination light from the light source 320 is incident on the navigation surface 206 at a region directly below the navigation sensor 318. Thus, the imaging lens feature 326 and the image sensor 404 of the navigation sensor 318 are vertically aligned along a direction normal to the navigation surface 206 from the illuminated region of the navigation surface. However, in other embodiments, the imaging lens feature 326 and the image sensor 404 of the navigation sensor 318 may not be vertically aligned along the direction normal to the navigation surface 206 from the illuminated region of the navigation surface.

The body structure 322 of the integrated SMT package 310 further includes a groove 328, which is positioned between the light source 320 and the navigation sensor 318, as illustrated in FIG. 3C. In the illustrated embodiment, the groove 328 has a cross section in a triangular configuration. However, in other embodiments, the groove 328 may have a cross section in another configuration. The groove 328 is used to prevent optical noise from being transmitted from the light source 320 to the navigation sensor 318, which may degrade the image quality of frames of image data captured by the imaging array 404 of the navigation sensor. In an embodiment, as described in more detail below, the groove 328 is used to position a part of the aperture lid member 312, which is opaque, between the light source 320 and the navigation sensor 318 when the aperture lid member is attached to the integrated SMT package 310 to block optical noise from the light source 320 to the navigation sensor 318 through the optically transparent body structure 322.

As shown in FIGS. 3A and 3C, the body structure 322 of the integrated SMT package 310 may further include attachment features 330 to physically attach the aperture lid member 312 to the body structure 322. In the illustrated embodiment, the attachment features 330 are holes or depressions to be used along with the groove 328 to attach the aperture lid member 312 to the body structure 322 so that the aperture lid member is affixed and aligned to the integrated SMT package 310. In other embodiments, the body structure 322 may include other types of features or mechanisms to physically attach the aperture lid member 312 to the body structure 322. Alternatively, the aperture lid member 312 may be attached to the body structure 322 using an adhesive material.

In an embodiment, the body structure 322 is fabricated using a molding process, such as a transfer molding process, using an appropriate material, e.g., clear thermoset plastic material. However, in other embodiments, the body structure 322 may be fabricated using other appropriate fabrication processes for an appropriate optically transparent material.

The aperture lid member 312 includes an aperture 332 that limits the light transmitted to the navigation sensor 318 via the imaging lens feature 326 of the body structure 322 when the aperture lid member is attached to the body structure. In particular, the aperture 332 of the aperture lid member 312 blocks some of the ambient light to improve the image quality of the frames of image data captured by the imaging array 404 of the navigation sensor 318. Thus, the aperture lid member 312 is opaque to block light striking the aperture lid member.

As illustrated in FIG. 3C, the aperture lid member 312 further includes a protrusion 334 that is configured to fit into the groove 328 of the body structure 322. In the illustrated embodiment, the protrusion 334 has a cross section in a triangular configuration. However, in other embodiments, the cross section of the protrusion 334 may have another configuration.

The aperture lid member 312 further includes attachment features 336 that are configured to connect with the attachment features 330 of the body structure 322 to attach the aperture lid member to the body structure. In the illustrated embodiment, the attachment features 336 of the aperture lid member 312 are plug-like protrusions configured to fit into the attachment features 330 of the body structure 322. However, in other embodiments, the configuration of the attachment features 336 of the aperture lid member 312 may vary depending on the attachment features 330 of the body structure 322.

The operation of the optical navigation apparatus 200 in accordance with an embodiment of the invention will now be described with reference to FIGS. 3C and 4. The operation begins by activating the light source 320 to illuminate a region of the navigation surface 206 with illumination light. The light source 320 is activated when the driver circuit 402 of the navigation sensor 318, which is controlled by the processor 406, provides a driving signal to the light source. In response, the light source 320 generates illumination light, which is emitted through the optically transparent body structure 322 toward the navigation surface 320 in a direction normal to the navigation surface. The illumination light from the light source 320 is then internally reflected by the reflective surface of the prism-like feature 324 of the body structure 322 so that the illumination light strikes the navigation surface 206 at a desired angle of incidence, e.g., a non-zero angle of incidence with respect to normal to the navigation surface, at a region of the navigation surface below the navigation sensor 318. The illumination light is then reflected from the navigation surface 206 and transmitted to the imaging lens feature 326 of the body structure 322 via the aperture 332 of the aperture lid member 312.

The reflected illumination light at the imaging lens feature 326 of the body structure 322 is then focused onto the imaging array 404 of the navigation sensor 318 by the imaging lens feature. In response to the received light, the imaging array 404 under the control of the processor 406 produces frames of image data of the illuminated navigation surface 206. The frames of image data are then processed by the navigation engine 408 to compute estimated displacements between the optical navigation apparatus 200 and the navigation surface 206.

Figure 5:
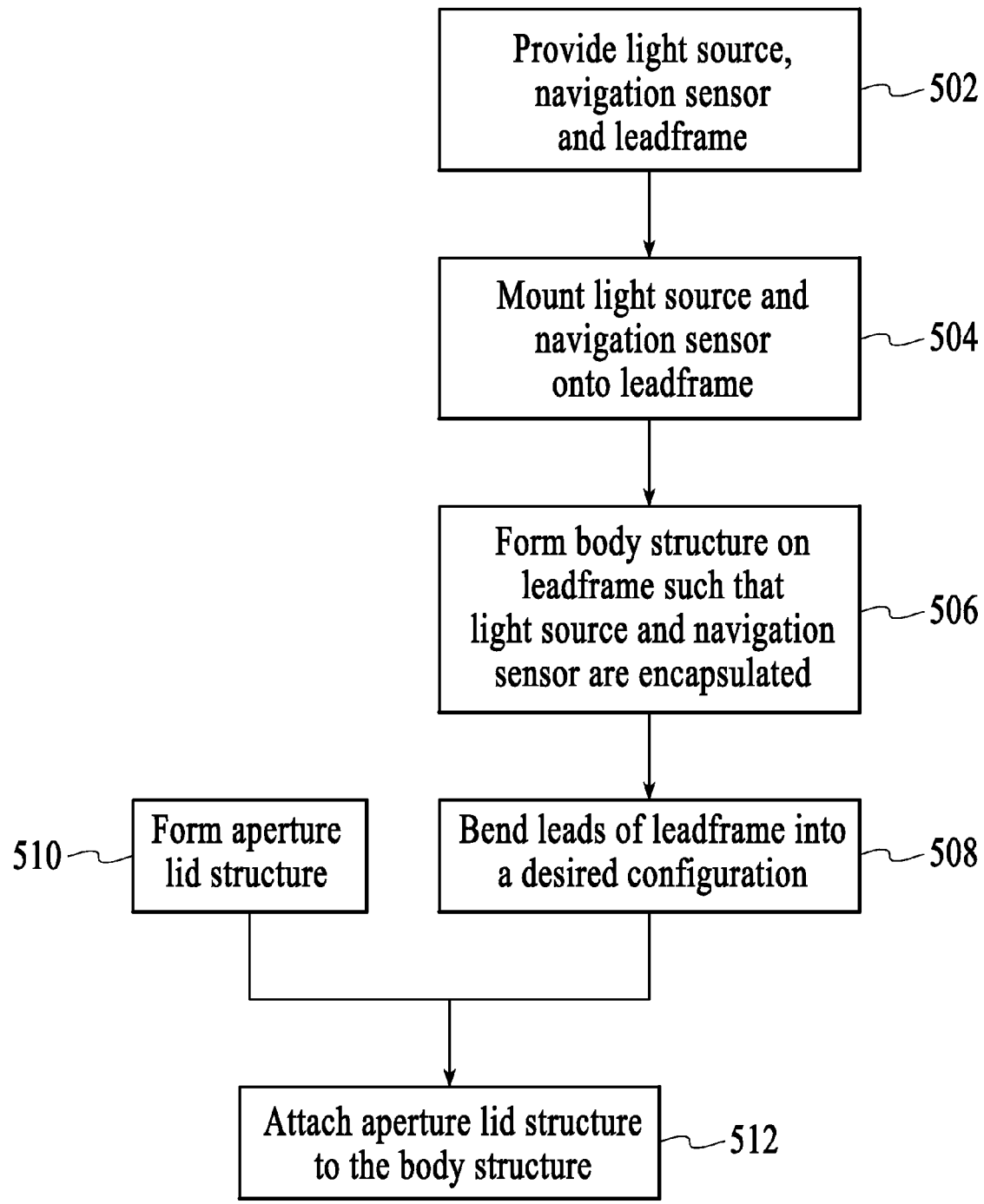
FIG. 5 is a flow diagram of a method for making an optical navigation apparatus in accordance with an embodiment of the invention.

A method for making an optical navigation apparatus, such as the optical navigation apparatus 200, in accordance with an embodiment of the invention is described with reference to a process flow diagram of FIG. 5. At block 502, a light source, a navigation sensor and a leadframe are provided. Next, at block 504, the light source and the navigation sensor are mounted onto the leadframe. Next, at block 506, an optically transparent body structure is formed on the leadframe such that the light source and the navigation sensor are encapsulated by the body structure. When the body structure is formed, features such as a prism-like feature, an imaging lens feature, a groove and attachment features of the body structure are also formed. In an embodiment, the body structure is formed using a transfer molding process using a thermoset plastic material. However, in other embodiments, the body structure may be formed using other processes. Next, at block 508, the leads of the leadframe may be bent into a desired configuration, such as the configuration shown in FIGS. 3A and 3B. At block 510, in a separate process, an aperture lid member is formed. When the aperture lid member is formed, features such as an aperture, a protrusion and attachment features of the aperture lid member are also formed. The aperture lid member may be formed by a molding process, such as a transfer or injection molding process. Next, at block 512, the aperture lid member is attached to the body structure using the attachment features of the aperture lid member and the attachment features of the body structure, as well as the protrusion of the aperture lid member and the groove of the body structure. In other embodiments, the order of these processing blocks may differ, if possible. Furthermore, in some embodiments, one or more of these processing blocks may be performed in parallel.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical navigation apparatus comprising;
   a leadframe;
   a light source mounted on the leadframe, the light source being configured to emit illumination light;
   a sensor having an imaging array mounted on the leadframe; and
   an optically transparent body structure connected to the leadframe such that the light source and the sensor are encapsulated by the optically transparent body structure so that the light source and the sensor are completely enveloped by the optical transparent body structure, the optically transparent body structure including a prism-shaped feature positioned over the light source and an imaging lens feature positioned over the sensor, the prism-shaped feature being configured to internally reflect the illumination light from the light source toward a target surface, the imaging lens feature being configured to receive the illumination light reflected from the target surface and optically manipulate the received illumination light onto the imaging array of the sensor.

2. The apparatus of claim 1 wherein the prism-shaped feature of the optically transparent body structure includes a flat surface that is not normal to a surface of the leadframe on which the light source is mounted, the flat surface being used to internally reflect the illumination light from the light source.

3. The apparatus of claim 2 wherein the prism-shaped feature of the optically transparent body structure is configured to have a cross section in the shape of a right triangle.

4. The apparatus of claim 1 wherein the light source includes a light emitting diode die or a laser diode die.

5. The apparatus of claim 1 wherein the sensor is a navigation sensor that includes a driver circuit configured to generate driving signals for the light source and a navigation engine configured to process frames of image data captured by the imaging array to estimate displacements between the apparatus and the target surface.

6. The apparatus of claim 1 wherein the optically transparent body structure includes a groove positioned between the light source and the sensor to prevent optical noise from being transmitted to the sensor from the light source.

7. The apparatus of claim 1 further comprising an aperture lid member having an aperture and a protrusion, and wherein the optically transparent body structure includes an elongate groove positioned between the light source and the sensor, the protrusion of the aperture lid member being configured to be inserted into the elongate groove when the aperture lid member is attached to the optically transparent body structure so that optical noise from the light source is blocked from being transmitted to the sensor through the optically transparent body structure, the aperture lid member being configured such that the imaging lens feature of the body structure is positioned between the aperture and the sensor when the aperture lid member is attached to the optically transparent body structure.

8. The apparatus of claim 7 wherein the groove of the optically transparent body structure is configured to have a triangular cross-sectional configuration and wherein the protrusion of the aperture lid member is also configured to have a triangular cross-sectional configuration so that the protrusion of the aperture lid member is inserted into the groove of the body structure when the aperture lid member is attached to the optically transparent body structure.

9. An optical navigation apparatus comprising:
a leadframe;
a light source mounted on the leadframe, the light source being configured to emit illumination light;
a sensor having an imaging array mounted on the leadframe; and
an optically transparent body structure connected to the leadframe such that the light source and the sensor are encapsulated by the optically transparent body structure so that the light source and the sensor are completely enveloped by the optical transparent body structure, the optically transparent body structure including a prism-shaped feature positioned over the light source and an imaging lens feature positioned over the sensor, the prism-shaped feature being configured to internally reflect the illumination light from the light source so that the illumination light strikes a target surface at a nonzero angle of incidence with respect to normal to the target surface, the imaging lens feature being configured to receive the illumination light reflected from the target surface and optically manipulate the received illumination light onto the sensor, the optically transparent body structure further including a groove positioned between the light source and the image sensor, the groove being used to prevent optical noise from being transmitted to the sensor from the light source.

10. The apparatus of claim 9 wherein the prism-shaped feature of the optically transparent body structure includes a flat surface that is not normal to a surface of the leadframe on which the light source is mounted, the flat surface being used to internally reflect the illumination light from the light source.

11. The apparatus of claim 10 wherein the prism-shaped feature of the optically transparent body structure is configured to have a cross section in the shape of a right triangle.

12. The apparatus of claim 9 wherein the sensor is a navigation sensor that includes a driver circuit configured to generate driving signals for the light source and a navigation engine configured to process frames of image data captured by the imaging array to estimate displacements between the apparatus and the target surface.

13. The apparatus of claim 9 further comprising an aperture lid member having an aperture and a protrusion, and wherein the optically transparent body structure includes an elongate groove positioned between the light source and the sensor, the protrusion of the aperture lid member being configured to be inserted into the elongate groove when the aperture lid member is attached to the optically transparent body structure so that optical noise from the light source is blocked from being transmitted to the sensor through the optically transparent body structure, the aperture lid member being configured such that the imaging lens feature of the optically transparent body structure is positioned between the aperture and the sensor when the aperture lid member is attached to the optically transparent body structure.

14. The apparatus of claim 13 wherein the groove of the optically transparent body structure is configured to have a triangular cross-sectional configuration and wherein the protrusion of the aperture lid member is also configured to have a triangular cross-sectional configuration so that the protrusion of the aperture lid member is inserted into the groove of the optically transparent body structure when the aperture lid member is attached to the optically transparent body structure.

15. A method for making an optical navigation apparatus, the method comprising:
providing a light source, a sensor with an imaging array and a leadframe;
mounting the light source and the sensor onto the leadframe; and
forming an optically transparent body structure connected to the leadframe such that the light source and the sensor are encapsulated by the optically transparent body structure so that the light source and the sensor are completely enveloped by the optical transparent body structure, the optically transparent body structure including a prism-shaped feature positioned over the light source and an imaging lens feature positioned over the sensor, the prism-shaped feature being configured to internally reflect the illumination light from the light source toward a target surface during operation, the imaging lens feature being configured to receive the illumination light reflected from the target surface and optically manipulate the received illumination light onto the imaging array of the sensor.

16. The method of claim 15 further comprising:
forming an aperture lid member comprising an aperture and a protrusion; and
attaching the aperture lid member to the optically transparent body structure such that the imaging lens feature of the optically transparent body structure is positioned between the aperture and the sensor and such that the protrusion is inserted into an elongate groove of the optically transparent body structure, the elongate groove being positioned between the light source and the sensor to prevent optical noise from being transmitted to the sensor from the light source during operation.

17. The method of claim 15 wherein the forming the optically transparent body structure includes transfer molding a plastic material into the optically transparent body structure.

* * * * *